US009811083B2

(12) United States Patent
Stamatovski et al.

(10) Patent No.: US 9,811,083 B2
(45) Date of Patent: Nov. 7, 2017

(54) SYSTEM AND METHOD OF CONTROLLING AUTONOMOUS VEHICLES

(71) Applicant: EASY AERIAL INC., Long Island City, NY (US)

(72) Inventors: Ivan Stamatovski, Long Island City, NY (US); Mohammad Hefny, Cairo (EG)

(73) Assignee: Easy Aerial Inc., Long Island City, NY (US)

( * ) Notice: Subject to any disclaimer, the term of this patent is extended or adjusted under 35 U.S.C. 154(b) by 49 days.

(21) Appl. No.: 14/949,541

(22) Filed: Nov. 23, 2015

(65) Prior Publication Data

US 2017/0146995 A1  May 25, 2017

(51) Int. Cl.
| | |
|---|---|
| *B60W 30/18* | (2012.01) |
| *B60W 50/00* | (2006.01) |
| *G05D 1/00* | (2006.01) |
| *B64C 39/02* | (2006.01) |
| *G07C 5/00* | (2006.01) |

(52) U.S. Cl.
CPC ......... *G05D 1/0027* (2013.01); *B64C 39/024* (2013.01); *G07C 5/008* (2013.01); *B64C 2201/021* (2013.01); *B64C 2201/024* (2013.01); *B64C 2201/104* (2013.01); *B64C 2201/108* (2013.01); *B64C 2201/146* (2013.01)

(58) Field of Classification Search
CPC ...... B64C 13/24; G06F 17/00; B60W 50/029; B60W 30/18

USPC .......... 701/2, 3, 120, 537; 244/189; 340/945
See application file for complete search history.

(56) References Cited

U.S. PATENT DOCUMENTS

| | | | | |
|---|---|---|---|---|
| 7,123,169 | B2* | 10/2006 | Farmer | G01S 7/003 340/945 |
| 7,581,702 | B2* | 9/2009 | Olson | G05D 1/0022 244/189 |
| 9,051,043 | B1* | 6/2015 | Peeters | B64C 19/00 |
| 9,174,733 | B1* | 11/2015 | Burgess | B64D 1/12 |
| 9,185,147 | B1* | 11/2015 | Keel | G06F 17/3087 |
| 2007/0244608 | A1* | 10/2007 | Rath | G05D 1/0038 701/3 |
| 2015/0032293 | A1* | 1/2015 | O'Neill | B25J 13/006 701/2 |
| 2015/0269790 | A1* | 9/2015 | Batcheller | G08G 1/20 701/537 |
| 2015/0339933 | A1* | 11/2015 | Batla | G08G 5/0069 701/120 |

\* cited by examiner

*Primary Examiner* — Thomas G Black
*Assistant Examiner* — Wae Louie
(74) *Attorney, Agent, or Firm* — McCarter & English, LLP; David R. Burns

(57) ABSTRACT

A system and method is provided for the establishment of a fleet of networked unmanned vehicles. The system provides at least one vehicle control device configured to interface with a third party unmanned vehicle and establish communications with other unmanned vehicles and with remote control stations. A plurality of vehicle control devices may be used with a plurality of remote control stations to establish a networked fleet of unmanned vehicles. Communication between the networked vehicles may include control information, sensor information, and mission information.

15 Claims, 2 Drawing Sheets

SYSTEM AND METHOD OF CONTROLLING AUTONOMOUS VEHICLES

FIELD OF THE INVENTION

The invention relates to systems and methods of controlling unmanned vehicles, including through the use of two-way communication between a control station and an unmanned vehicle, in which the control station may communicate with more than one unmanned vehicle and an unmanned vehicle may communicate with more than one control station or other unmanned vehicle, establishing a network of controlled autonomous vehicles.

BACKGROUND OF THE INVENTION

Unmanned vehicles, such as remote controlled or autonomous airplanes, drones, boats, and cars may be used for a variety of purposes. Such vehicles frequently operate independently, with a single controller and/or a single station to which data is relayed. Coordinating the actions of multiple vehicles, e.g., fleets, may be difficult though independent controllers. Such coordination may be further hampered if the multiple vehicles are of different types or of different manufacture.

SUMMARY OF THE INVENTION

The invention addressing these and other drawbacks relates generally to a system and method of controlling unmanned vehicles. More specifically, the invention relates to systems and method of establishing a network of controlled unmanned vehicles. Implementations of the disclosure provide systems and methods that include remote and autonomous control of individual vehicles, as well networks of individual of vehicles.

In an implementation consistent with the present disclosure, a system may include a vehicle control device. The vehicle control device may comprise one or more physical processors programmed by computer program instructions. The vehicle control device may act upon the programmed instructions to establish a vehicle communications interface with a vehicle control board of the unmanned vehicle, transmit control instructions to the vehicle control board of the unmanned vehicle, receive control feedback from the vehicle control board of the unmanned vehicle, receive sensor data from at least one sensor associated with the unmanned vehicle, establish a remote communications interface with a remote control system, receive control instructions from the remote control system, and transmit the sensor data to the remote control system. The vehicle control device may be integrally included with a vehicle control board or may be an add-on to an existing vehicle control board.

In an implementation consistent with the present disclosure, a method of establishing a networked fleet of unmanned vehicles is provided. The method may include attaching a vehicle control device to an unmanned vehicle (or otherwise manufacturing the unmanned vehicle to include the vehicle control device), the vehicle control device having one or more physical processors programmed with computer program instructions that, when executed by the one or more physical processors, cause the vehicle control device to perform actions. The method may further include establishing, by the vehicle control device, a vehicle communications interface with a vehicle control board of the unmanned vehicle, transmitting, by the vehicle control device, control instructions to the vehicle control board of the unmanned vehicle, receiving, by the vehicle control device, control feedback from the vehicle control board of the unmanned vehicle, receiving, by the vehicle control device, sensor data from at least one sensor associated with the unmanned vehicle, establishing, by the vehicle control device, a remote communications interface with a remote control system, receiving, by the vehicle control device, control instructions from the remote control system, and transmitting, by the vehicle control device, the sensor data to the remote control system.

The vehicle control device (of an unmanned vehicle) may establish two-way communication with a remote control station (e.g., a ground-based control station). The remote control station may establish two-way communication with other unmanned vehicles as well. Additionally, the vehicle control device may establish two-way communication with other unmanned vehicles directly in a peer-to-peer manner or indirectly through one or more remote control stations. The vehicle control device may establish two-way communication with multiple remote control stations as well. The various communications facilitates a connected network of unmanned vehicles and remote control stations. Such communications may be in real-time over one or more networks (e.g., the Internet) using various communication protocols (e.g., web sockets), thereby facilitating control of the network of unmanned vehicles over large distances/areas, rather than merely line of sight or short range communication control.

Through the network, unmanned vehicles may communicate various information (e.g., sensor information, state information, etc.) to other unmanned vehicles and/or to human operators (also referred to herein as "pilots") at remote control stations. In this manner, unmanned vehicles may be made aware of other unmanned vehicles as well as information obtained by or otherwise known by the other unmanned vehicles. Additionally or alternatively, a pilot may be made of various information relating to unmanned vehicles the pilot is controlling or of various information relating to other unmanned vehicles that other pilots are piloting (or of various information relating to other unmanned vehicles that are operating autonomously).

In some instances, a capability or information possessed by one unmanned vehicle may be shared with another unmanned vehicle that may not have such capability or information through the network of unmanned vehicles described herein. For instance, a first vehicle having infrared (IR) capabilities may share IR sensor information with a second vehicle that does not have such capabilities. Likewise, a first vehicle (or pilot) having knowledge of restricted airspace may share such information with a second vehicle (or pilot). In still other example, a first vehicle (or pilot) having knowledge of turbulence or other environmental issues may share that information with a second vehicle (or pilot).

In an implementation, the vehicle control device may facilitate a universal platform that is compatible with existing unmanned autopilot boards (e.g., PIXHAWK, APM, MULTIWII, etc.) and acts as a higher level controller and communication device. For instance, the vehicle control device may issue commands to the various unmanned autopilot boards (according to their respective command formats/syntax) and translate any information from the various unmanned autopilot boards into a standard format. Thus, the vehicle control device facilitates communication and control with a given unmanned autopilot board, but also facilitates communication between unmanned vehicles that have different unmanned autopilot boards (acting as a communication bridge between such autopilot boards).

In an implementation, the system facilitates real-time first person view and camera control features. The system may control various camera features (e.g., rotation, zoom, aperture, focus, start-stop, etc.) and route the video to one or more ground control stations. In this manner, pilots or others may use the real-time camera information to help pilot (or plot courses) for unmanned vehicles or for other purposes.

In an implementation, the system may collect vehicle status, position, sensor information, and health data (telemetry) and other information and provide such information in a user interface for display. In this manner, pilots and others may have access to such information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention relates generally to systems and methods of controlling unmanned vehicles (UVs). UVs may include any type of vehicle, such as airplanes, helicopters, quadcopters, boats, cars, and any other device capable of travel. UVs consistent with the present disclosure may be autonomously controlled, e.g., self-directed, and/or may be remotely controlled by either humans and/or software.

In some implementations, systems consistent with the present disclosure include one or more vehicle control devices (VCDs) configured to control UVs. VCDs may be configured so as to provide all control aspects to a UV, that is, a UV may be equipped with a VCD that performs all required control, steering, navigation, etc., functions of the UV. In some implementations, VCDs may be configured to interface with existing control units of a UV. For example, a UV may be equipped with a control unit provided by the UV manufacturer. A VCD may be configured to control the UV via the original control unit. For example, when in communication with a VCD, an original control unit may be configured to provide the UV with basic control functionality, e.g., basic attitude control in an aerial UV, and a VCD may be configured to communicate with the basic control unit to provide higher level control functions, e.g., navigation and throttle controls. VCDs consistent with the present disclosure may be configured to communicate with any and all types of UV control units.

In some implementations, VCDs consistent with the present disclosure may be equipped with communication functionality, e.g., Bluetooth, cellular, Wi-Fi, and any other relevant communications protocol. VCDs may be configured to communicate with other VCDs associated with other UVs and/or with one or more remote control stations (RCSs). Through communication with other UVs and with RCSs, multiple VCDs may be used to create a fleet of networked UVs. Such a networked UV fleet may share data collected by each UV and/or by the RCSs. Collected and shared data may include, for example, UV specific data such as location and speed, universal data such as weather patterns and terrain imagery, and/or instruction data such as flight/travel paths and/or mission descriptions.

Figure 1:
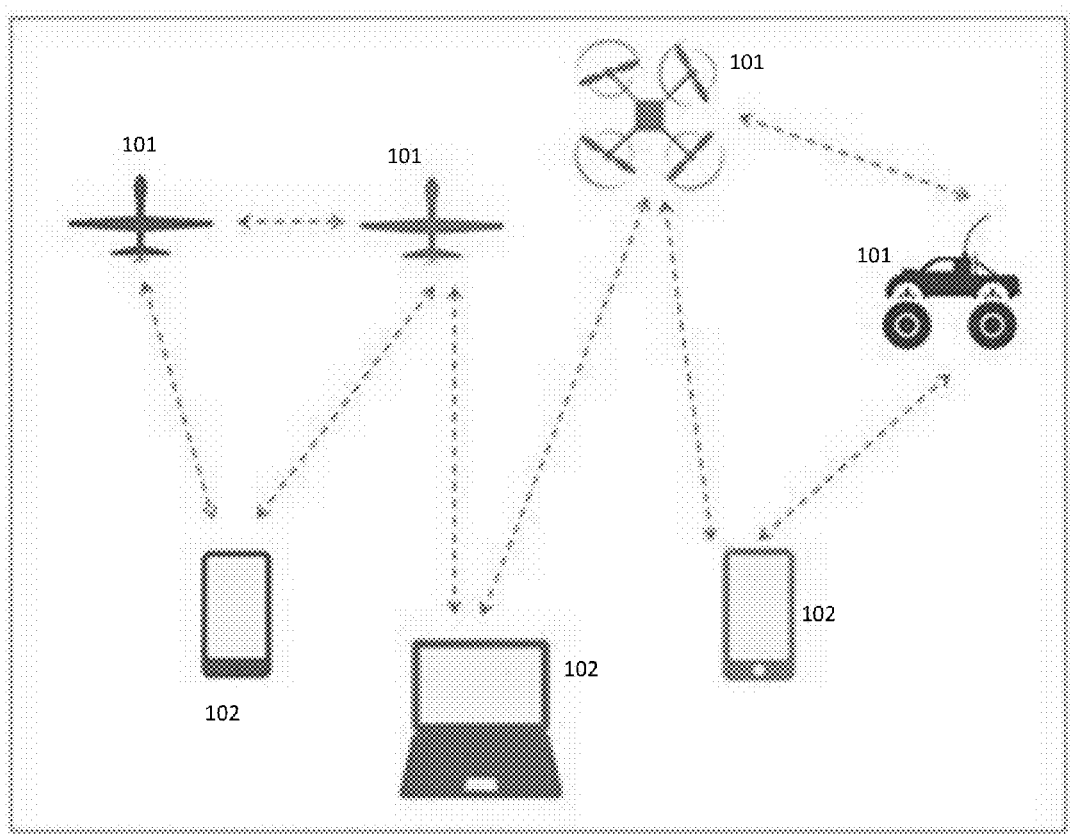
FIG. 1 illustrates a schematic of an exemplary networked vehicle fleet consistent with the present disclosure.

FIG. 1 illustrates a schematic of an exemplary networked vehicle fleet with an implementation. As illustrated in FIG. 1, several unmanned vehicles 101 and several remote control stations 102 may be included in fleet network 100 according to implementations of the present disclosure. As illustrated in FIG. 1, several types of UVs may be included in a UV network. Each UV 101 may be equipped with a VCD, through which it communicates with one or more RCSs 102. Furthermore, each RCS 102 may be configured for communication with one or more VCDs. Data and information captured by any one UV 101 may be shared through the network to any other UV 101 or RCS 102. Control schemes for one or multiple UVs 101 may originate from once RCS 102 and be communicated to the appropriate UV 101 even when direct connectivity does not exist between the specific RCS 102 and UV 101.

UV 101 may be any type of unmanned vehicle, including boats, planes, copters, cars, and others. In some implementations, UV 101 may be specifically manufactured for use with VCDs consistent with the present disclosure. In further implementations, UV 101 may be an unmanned vehicle manufactured and capable of operating without a VCD, e.g., a third-party UV. In such implementations, a VCD may be mounted to UV 101 and configured to establish a vehicle communications interface with the existing vehicle control board, as explained in greater detail below.

Figure 2:
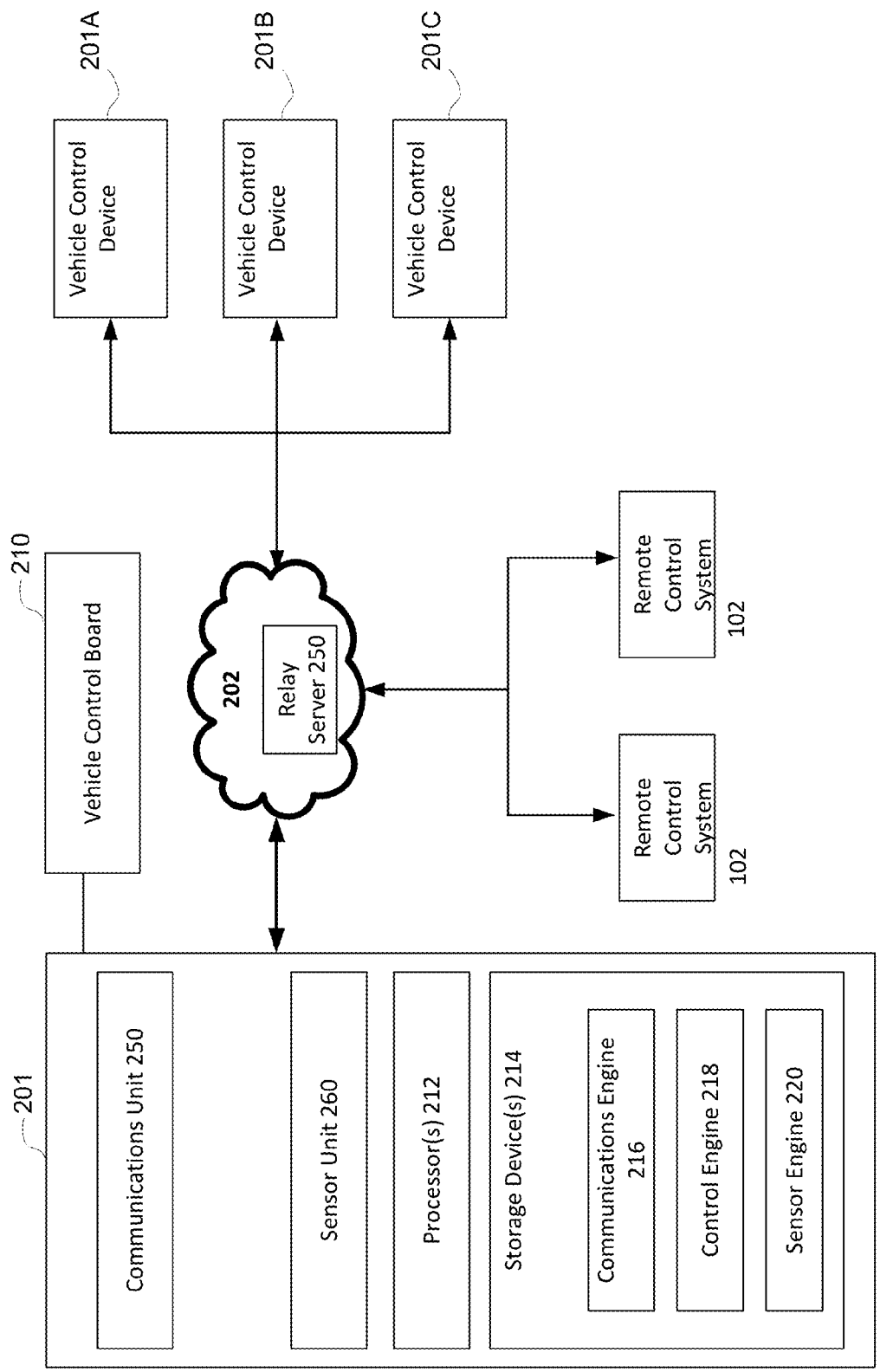
FIG. 2 illustrates an exemplary vehicle control device consistent with the present disclosure.

FIG. 2 illustrates an exemplary vehicle control device 201 consistent with the present disclosure. VCD 201 may include communications unit 250, sensor unit 260, at least one processing device 212, and at least one storage device 214. Storage device 214 may store programming instructions for processing device 212. Instructions may include communications engine 216, control engine 218, and sensor engine 220. Furthermore, storage device 214 may be configured to store additional data and information appropriate for the operation of VCD 201.

VCD 201 may be a specially created and programmed computing device configurable to run software. VCD 201 may include one or more processors 212 (also interchangeably referred to herein as processors 212, processor(s) 212, or processor 212 for convenience), one or more storage devices 214 (which may store communications engine 216, control engine 218, and sensor engine 220), and/or other components. Processors 212 may be programmed by one or more computer program instructions. For example, processors 212 may be programmed by instructions included in communications engine 216, control engine 218, and sensor engine 220, as well as other components and/or other instructions. As used herein, for convenience, the various engines may be described as performing an operation, when, in fact, the various instructions of these engines program the processors 212 (and therefore VCD 201) to perform the operation.

Communications engine 216 may include instructions that program VCD 201. The instructions of communications engine 216 may include, without limitation, instructions for collecting, collating, receiving, and transmitting data and information, and/or other instructions that program VCD 201 to perform various operations, each of which are described in greater detail herein. Communications engine 216 may cause processor 212 to communicate with one or more other VCD bearing UVs and/or one or more RCSs 102. Communications engine 216 may cause processor 212 to establish, via communications unit 250, a remote communication interface with one or more other VCD bearing UVs and/or one or more RCSs 102, as described in greater detail below.

Communications engine 216 may communicate, via communications unit 250, with other UVs 101 and with RCSs 102 using any suitable communications technology and protocol, including, for example, cellular telephony, internet connectivity via Wi-Fi, short range and long range radio, and others.

Communications engine 216 may send and receive various data to other UVs 101 and RCSs 102, including flight data, sensor and camera data, and/or mission data. Flight data may include, for example, information about current flight parameters of UV 101, such as speed, bearing, altitude, heading, location, etc. Sensor and camera data may include any information collected by sensors and cameras associated with UV 101, such as terrain imagery and weather information. Mission data may include any information about a mission or task to be performed by UV 101, such as flight plans.

Communications engine 216 may communicate with other aspects of the fleet network via communications unit 250. Communications unit 250 may include, without limitation, cellular antennas, Wi-Fi antennas, Bluetooth antennas, short range and long range radio antennas, and any other device suitable for establishing data communications over a distance. Communications unit 250 may further include GPS antennas configured for determining location information of VCD 201.

Communications engine 216 may send data in real-time as it is captured, with a slight delay, and/or may store and queue data for later transmission. In some implementations, for example, communications engine 216 may send sensor data, such as real-time video data from a UV camera to one or more RCS 102 simultaneously. As used herein, real-time refers to data that is transmitted immediately after collection and at substantially the same rate as it is collected. Real-time data may include delays due to processing, transmission bandwidth, and other hardware and software limitations.

Control engine 218 may include instructions that program VCD 201. The instructions of control engine 218 may include, without limitation, instructions for performing control of UV 101, and/or other instructions that program VCD 201 to perform various operations, each of which are described in greater detail herein. Control engine 218 may cause processor 212 to operate control over UV 101.

Control engine 218 may be configured to establish a vehicle communications interface with a vehicle control board 210 of a third party UV 101. Vehicle control board 210 may be an existing vehicle control board 210. That is, a third party UV 101 may be manufactured so as to be able to perform all expected functions with vehicle control board 210 and any associated remote devices. VCD 201 may be attached to the third party UV 101 and configured to override some or all of the native control functions of the vehicle control board 210. In some implementations of fleet network 100, a first VCD 201 may be attached to and communicate with vehicle control board 210 of a first UV 101 of a first type, and a second VCD 201 may be attached to and communicate with vehicle control board 210 of a second UV 101 of a second type. Different types of UVs 101 may include UVs 101 produced by different manufacturers, UVs 101 configured for operation in different media (i.e., on land, in the air, in the water), UVs 101 with differing and/or incompatible vehicle control boards 210, and any other type differences between UVs 101.

Vehicle control board 210 of UV 101 may control various aspects of UV 101. In some implementations, vehicle control board 210 may exert low-level control over UV 101. For example, in an aerial UV, vehicle control board 210 may exercise control over flight stability, attitude, pitch, and motor/engine power. In a car-type UV, vehicle control board 210 may exercise control over a transmission, motor/engine power, differential wheel power, steering, etc. VCD 201 may interface with vehicle control board 210 to exert high-level control over UV 101. For example, VCD 201 may control speed, direction, altitude, and other high-level aspects of the vehicle.

Thus, for example, control engine 218 may control the speed, direction, and altitude of an aerial vehicle, while vehicle control board 210 provides the appropriate amount of power to the engines and adjusts control surfaces appropriately to achieve these aspects.

The balance of control between VCD 201 and vehicle control board 210 described above is not limited to the description above and may vary in both directions. For example, in some implementations, control engine 218 may control every aspect of UV 101 through vehicle control board. In other implementations, control engine 218 may provide only very high-level control such as flight plans.

In some implementations, control engine 218 may act as an autopilot, providing all necessary control of UV 101. In some implementations, control engine 218 of VCD 201 may provide autonomous control to UV 101 based on broad commands. For example, broad commands may include a list of waypoints to be covered or an area of terrain to photograph. Control engine 218 may operate to translate broad commands into a specific control actions required to carry out the broad commands.

In some implementations, VCD 201 may provide UV 101 with additional functionality not provided by vehicle control board 210. For example, a third party UV 101 may be equipped with a vehicle control board 210 capable of controlling basic vehicle control instructions, such as flying or driving. An existing vehicle control board 210 may further include a radio frequency antenna configured to receive command and control instructions from a remote location. An existing vehicle control board 210, may, however, lack various features, such as the capability to operate the vehicle autonomously, the capability to transmit sensor, flight, and/or mission data from UV 101 to a remote receiver, and other features discussed herein. Thus, in addition to incorporating UV 101 into fleet network 100, the addition of VCD 201 to UV 101 may serve to enhance the functionality of UV 101 to permit it to perform smarter and coordinated functions.

In further implementations, control engine 218 may serve to relay control instructions provided by a remote operator, e.g. through RCS 102. A remote operator may or may not be human. That is, RCS 102 may generate and provide all necessary flight instructions to vehicle control board 210 of UV 101 through control engine 218.

In some implementations, VCD 201 may be mounted or attached in a removable fashion to UV 101. In some implementations, VCD 201 may attached to UV 101 for permanent integration. Control engine 218 may communicate with vehicle control board 210 using any of various communications protocols, such as USB, Bluetooth, TCIP/IP, I2C, serial port, and any means of serial communication available for control boards. Control engine 218 may act in concert with, may override, and/or may provide any level of control over vehicle control board 210. Vehicle control board 210 may include any type of device configured for controlling UV 101, including, but not limited to, autopilot boards such as Pixhawk, APM, KK2, MultiWii, and any other device that supports MAVLINK and/or MW protocols.

In some implementations, VCD 201 may integrate multiple third party UVs 101 operating under different communication protocols through of a shared data model. For example, an operator may wish to create an integrated fleet using some UVs 101 that employ the Mavlink protocol and some UVs that employ the MW protocol. Conventionally, such integration may be difficult or impossible. Each of the UVs 101 may be equipped with a VCD 201, as described above, that interfaces with the vehicle control board 210 of each UV 101 and captures all necessary data, e.g., IMU data, from each vehicle control board 210. Regardless of the units, formatting, scale, etc., of the data, each VCD 201 may translate that data into a shared data model to be used across the entire fleet network 100. Thus, even though the various vehicle control boards 210 of different fleet UVs 101 deploy differing protocols, a system employing multiple VCDs 201 enables each UV 101 to communicate with each other UV 101 through the shared data model. Thus, in some implementations, VCD 201 may UV data from a native format to a shared data model format.

In some implementations, VCD 201 may be configured to autonomously control UV 101 without the need for external control. For example, VCD 201 may be pre-programmed with mission details, e.g., flight paths, vehicle drive paths, etc., prior to initiation of the mission. VCD 201 may cause UV 101 to carry out the mission with no further instruction or control from external sources. During such a mission, VCD 201 may collect and store sensor data and may collect and communicate sensor data to an external receiver, such as RCS 102.

Sensor engine 220 may include instructions that program VCD 201. The instructions of sensor engine 220 may include, without limitation, instructions for gathering sensor data from sensor unit 260 and any other sensors associated with UV 101, and other instructions for VCD 201 to perform various operations, each of which are described in greater detail herein.

Sensor data may include, for example, data from various sensors, such as temperature sensors, pressure sensors, inertial measurement sensors, image sensors (e.g. cameras), and others. Sensors for collecting sensor data may be included in sensor unit 260, and/or may be included with UV 101 to which VCD 201 is attached.

Sensor data may be collected by sensors built-in to a third-party UV. For example, in implementations that include a third party UV to which VCD 201 is attached, VCD 201 may interface with control electronics of the UV to capture any sensor data collected by the third-party UV's equipment.

Sensor engine 220 may be configured to simultaneously and/or sequentially collect data from any number of sensors. For example, sensor engine 220 may control multiple cameras simultaneously, and may be set to take images on time-based intervals, or distance-based intervals automatically or manually.

In some implementations, sensor engine 220 may be configured to compare sensor data collected by sensors associated with UV 101 to sensor data collected by sensor unit 260. For example, both UV 101 and sensor unit 260 may include an inertial measurement unit (IMU). Sensor engine 220 may compare data collected by each of these IMUs to provide more accurate measurements. Other sensor data may be compared to provide more accurate and/or more precise information about flight aspects of a UV 101, including, but not limited to, speed, bearing, heading, altitude, etc.

As illustrated in FIG. 2, VCD 201 may be in communication with one or more RCSs 102 and/or one or more VCDs 201A, 201B, 201C via network 202. Member devices, e.g., RCSs 102 and UVs 101, of network 202 may be coupled to at least one other component via any suitable communication means, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. Communication via network 202 may further include one or more communication protocols, including, but not limited to, cellular, mobile data (3G, 4G, LTE, etc.), wifi, and other suitable technologies. In some implementations, network 202 my include direct connections between devices. Network 202 may additionally include one or more relay servers 250. Relay server 250 may serve as a communications hub for various UVs 101 and RCSs 102 connected to a fleet network 100. Relay server 250 may operate over the internet. Through fleet network 100, multiple pilots and/or automated autopilots in remote locations may share information between different UVs 101 simultaneously. Different UVs 101 may communicate to track each other's locations, coordinate flight movements, and execute group missions.

Fleet network 100 may include one or more RCS 102. RCS s 102 may provide a network operator means to access information from and/or provide command and control information to one or more UVs 101 of fleet network 100. Because each RCS 102 may communicate with a UV 101 via network 250, there are no technical limitations on the distance from which RCS 102 may communicate with UV 101. Users may remotely control their vehicles using controls provided through RCS 102. Users may provide broad commands to the VCD 201 of a UV 101 operating in an autonomous mode. Users may coordinate the actions of two or more UVs 101 via RCS 102. Each RCS may be located remotely from UVs 101 under control, for example in a ground or underground based facility, or in an airplane or ship. RCS 102 may comprise, without limitation, a server (e.g., having one or more server blades, processors, etc.), a gaming console, a handheld gaming device, a personal computer (e.g., a desktop computer, a laptop computer, etc.), a smartphone, and/or a tablet. In some implementations, RCS 102 may comprise a computing device specifically designed to perform the functions described herein.

Although illustrated in FIG. 2 as a single component, VCD 201 may include a plurality of individual components (e.g., computer devices) each programmed with at least some of the functions described herein. In this manner, some components of VCD 201 may perform some functions while other components may perform other functions, as would be appreciated. The one or more processors 212 may each include one or more physical processors that are programmed by computer program instructions. The various instructions described herein are exemplary only. Other configurations and numbers of instructions may be used, so long as the processor(s) 212 are programmed to perform the functions described herein.

Furthermore, it should be appreciated that although the various instructions are illustrated in FIG. 2 as being co-located within a single processing unit, in implementations in which processor(s) 212 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 212 may be programmed by one or more additional instructions that may perform some or all of the functionality attributed herein to one of the instructions.

The various instructions described herein may be stored in a storage device 214, which may comprise random access memory (RAM), read only memory (ROM), and/or other memory. The storage device may store the computer program instructions (e.g., the aforementioned instructions) to be executed by processor 212 as well as data that may be manipulated by processor 212. The storage device may comprise any type of storage media appropriate for storing computer-executable instructions and/or data, such as flash memory.

In FIG. 2, as well as in other drawing Figures, different numbers of entities than those depicted may be used. Furthermore, according to various implementations, the components described herein may be implemented in hardware and/or software that configure hardware.

Systems consistent with the present disclosure may provide the capability to achieve various goals. Fleet network 100 may permit a company or government to monitor, control, communicate with, and obtain information about an unlimited number of UVs 100 located around the globe. Information from fleet network 100 may be integrated via one or more RCSs 102 to provide a complete picture of the fleet and other items of interest. For example, a military operation employing a networked fleet of drones could be provided complete imagery of a battlefield. The loss of a drone in such a scenario may cause the remaining drones to redeploy to ensure maximum coverage. In some implementations, multiple pilots, drivers, and/or controllers in different locations may all share information from different simultaneous vehicles, enabling the coordination and execution of group missions. Because the location of pilots, drivers, and/or controllers is not constrained, the system may make it easier to find the best pilot or driver for a particular task, rather than being forced to rely on a pilot or driver who happens to be in the right location.

In some implementations, VCDs 201 consistent with the present disclosure may facilitate the networking of a vehicle fleet. Because VCDs 201 of the present invention may be configured to communicate with and provide control instructions to vehicle control boards 210 of existing UVs 101, it is not required that an entity wishing to construct a networked vehicle fleet purchase new UVs 101. VCD 201 may be mounted to existing UVs 101 of differing type and manufacture and may enable communication between all of them, acting as a universal bridge. All data captured by sensors and generated by control boards of such various UVs 101 may be captured and integrated for transfer as part of the communication stream with the RCS. Such transfer may occur in real-time, at a slight delay, and/or after queuing the data for later transfer.

The foregoing provides discussion of several exemplary implementations of a vehicle control device 201, remote control station 102, and networked fleet 100. The foregoing, however, is not intended to be limiting, as many alternative implementations of the system providing additional benefits may further be provided.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for establishing a networked fleet of unmanned vehicles, the system comprising:
 a first vehicle control device mounted on a first unmanned vehicle, the first vehicle control device configured to interface with an existing first vehicle control board of the first unmanned vehicle, and further configured to control the first unmanned vehicle, wherein the first vehicle control device comprises one or more physical processors programmed by computer program instructions that, when executed, cause the vehicle control device to:
  establish a first vehicle communications interface with the first vehicle control board of the first unmanned vehicle;
  transmit control instructions to the first vehicle control board of the first unmanned vehicle;
  receive control feedback from the first vehicle control board of the first unmanned vehicle;
  receive sensor data from at least one sensor associated with the first unmanned vehicle;
  establish a first communications interface with a remote control system;
  receive control instructions from the remote control system; and
  transmit the sensor data to the remote control system; and
 a second vehicle control device mounted on a second unmanned vehicle, the second vehicle control device configured to interface with an existing second vehicle control board of the second unmanned vehicle, and comprising one or more second physical processors programmed by computer program instructions that, when executed, cause the second vehicle control device to:
  establish a second vehicle communications interface with the second vehicle control board of the second unmanned vehicle;
  transmit control instructions to the second vehicle control board of the second unmanned vehicle;
  receive control feedback from the second vehicle control board of the second unmanned vehicle;
  receive second sensor data from at least one sensor associated with the second unmanned vehicle;
  establish a second communications interface between the first vehicle control device and the second vehicle control device using a cellular communications network; and transmit the second sensor data to the first vehicle control device via the second communications interface.

2. The system of claim 1, wherein transmitting the second sensor data to the first vehicle control device includes transmitting the second sensor data via a relay server.

3. The system of claim 1, wherein the first vehicle control device is removably mounted to the first unmanned vehicle.

4. The system of claim 1, wherein the first unmanned vehicle is of a first unmanned vehicle type and the second unmanned vehicle is of a second unmanned vehicle type.

5. The system of claim 4, wherein the first vehicle control board of the first unmanned vehicle cannot directly interface with the second vehicle control board of the second unmanned vehicle.

6. The system of claim 1, wherein transmitting the sensor data to the remote control system includes transmitting the sensor data in real-time.

7. The system of claim 1, wherein the sensor information includes at least of image data and video data.

8. The system of claim 1, wherein the first vehicle control device is configured to interface with the existing first vehicle control board of the first unmanned vehicle using one of a USB, Bluetooth, TCIP/IP, I²C, or a serial port.

9. A method of establishing a networked fleet of unmanned vehicles, comprising:
mounting a first vehicle control device on a first unmanned vehicle, wherein the first vehicle control device is configured to interface with an existing first vehicle control board of the first unmanned vehicle;
establishing, by the first vehicle control device, a vehicle communications interface with the first vehicle control board of the first unmanned vehicle;
transmitting, by the first vehicle control device, control instructions to the first vehicle control board of the unmanned vehicle;
receiving, by the first vehicle control device, control feedback from the first vehicle control board of the first unmanned vehicle;
receiving, by the first vehicle control device, sensor data from at least one sensor associated with the first unmanned vehicle;
establishing, by the first vehicle control device, a communications interface with a remote control system;
receiving, by the first vehicle control device, control instructions from the remote control system;
transmitting, by the first vehicle control device, the sensor data to the remote control system;
mounting a second vehicle control device to a second unmanned vehicle, wherein the second vehicle control device is configured to interface with an existing second vehicle board of the second unmanned vehicle, and the second vehicle control device having one or more physical processors programmed with computer program instructions that, when executed by the one or more physical processors, cause the vehicle control device to perform actions;
establishing, by the second vehicle control device, a second vehicle communications interface with the second vehicle control board of the second unmanned vehicle;
transmitting, by the second vehicle control device, control instructions to the second vehicle control board of the second unmanned vehicle;
receiving, by the second vehicle control device, control feedback from the second vehicle control board of the second unmanned vehicle;
receiving, by the second vehicle control device, second sensor data from at least one sensor associated with the second unmanned vehicle;
establishing, by the second vehicle control device, a second communications interface between the first vehicle control device and the second vehicle control device using a cellular communications network; and
transmitting, by the second vehicle control device the second sensor data to the first vehicle control device.

10. The method of claim 9, wherein transmitting the second sensor data to the first vehicle control device includes transmitting the second sensor data via a relay server.

11. The method of claim 9, wherein the first vehicle control device is removably mounted to the first unmanned vehicle.

12. The method of claim 9, wherein the first unmanned vehicle is of a first unmanned vehicle type and the second unmanned vehicle is of a second unmanned vehicle type.

13. The method of claim 12, wherein the first vehicle control board of the first unmanned vehicle cannot directly interface with the second vehicle control board of the second unmanned vehicle.

14. The method of claim 9, wherein transmitting the sensor data to the remote control system includes transmitting the sensor data in real-time.

15. The method of claim 9, wherein the sensor information includes at least of image data and video data.

* * * * *